June 10, 1941.　　　J. MIHALYI　　　2,245,213
DOUBLE EXPOSURE PREVENTION DEVICE
Filed Oct. 5, 1939　　　2 Sheets-Sheet 1

JOSEPH MIHALYI
INVENTOR

BY
ATTORNEYS

June 10, 1941.  J. MIHALYI  2,245,213
DOUBLE EXPOSURE PREVENTION DEVICE
Filed Oct. 5, 1939  2 Sheets-Sheet 2
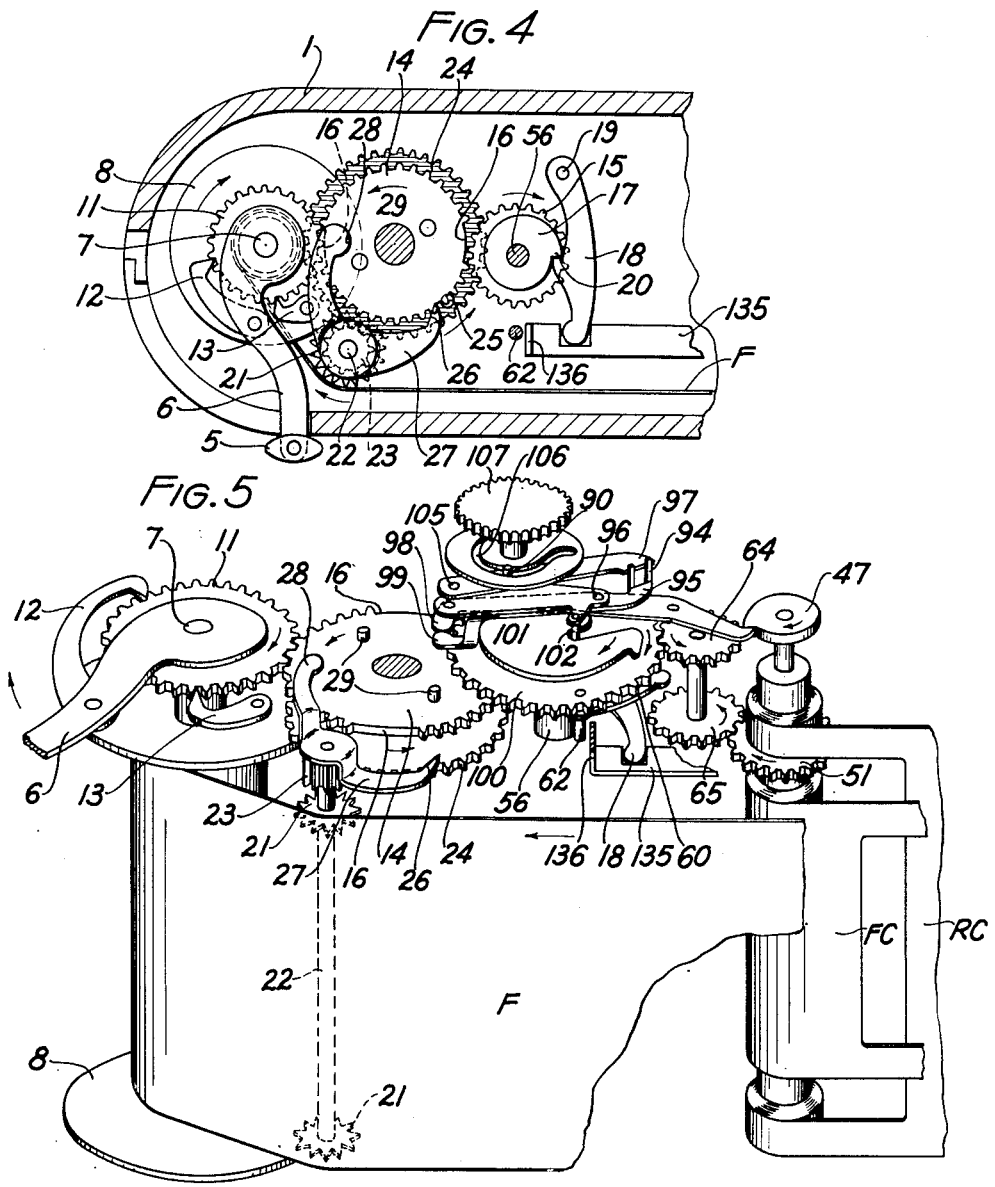
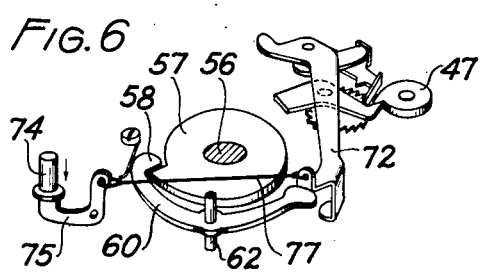
JOSEPH MIHALYI
INVENTOR
BY
ATTORNEYS Patented June 10, 1941

2,245,213

UNITED STATES PATENT OFFICE 2,245,213

DOUBLE EXPOSURE PREVENTION DEVICE

Joseph Mihalyi, Rochester, N. Y., assignor to Eastman Kodak Company, Rochester, N. Y., a corporation of New Jersey Application October 5, 1939, Serial No. 298,108

11 Claims. (Cl. 95—31)

This invention relates to photography, and more particularly to photographic cameras of the type employing roll film.

One object of my invention is to provide a means for preventing double exposure in such cameras and to provide intergearing between the film winding mechanism and a shutter setting mechanism so arranged that the film winding mechanism can only be operated when the shutter setting mechanism is unlocked and the shutter setting mechanism can only be operated when the film is wound. Another object of my invention is to provide a shutter of the type requiring setting before an exposure can be made, in which the shutter can only be set by the film winding mechanism through gearing which automatically disconnects the film winding mechanism before the film winding operation is complete so that only the first part of the movement of the film winding mechanism sets the shutter. A still further object of my invention is to provide a device for measuring an exposure area so that movement of the film itself through suitable connections with the film winding mechanism and shutter setting mechanism will cause the film winding mechanism to be latched to the already latched shutter setting mechanism. Other objects will appear from the following specification, the novel features being particularly pointed out in the claims at the end thereof.

Coming now to the drawings, in which like reference characters denote like part throughout:

Fig. 4 is a fragmentary view, partially in section and partially in elevation, showing a plan view of some of the gearing connecting the shutter setting and film winding mechanism.

Fig. 5 is an enlarged perspective fragmentary view showing portions of the double exposure prevention mechanism, and Fig. 6 is a fragmentary perspective detai view showing a portion of the shutter releasing mechanism.

Since the focal plane shutter which is used to illustrate the present embodiment of my invention is not in itself new and is fully illustrated in my two patents—2,140,446, Focal plane shutter granted December 13, 1938, and 2,165,403, Control mechanism for focal plane shutters, granted July 11, 1939—only such parts of this type of shutter as are necessary for an understanding of the present invention will be described in this specification. So far as this specification is concerned, it is only necessary that the shutter is of the type in which one shaft must be turned to set the shutter and tension the spring or springs for a shutter operation to make an exposure.

Figure 1:
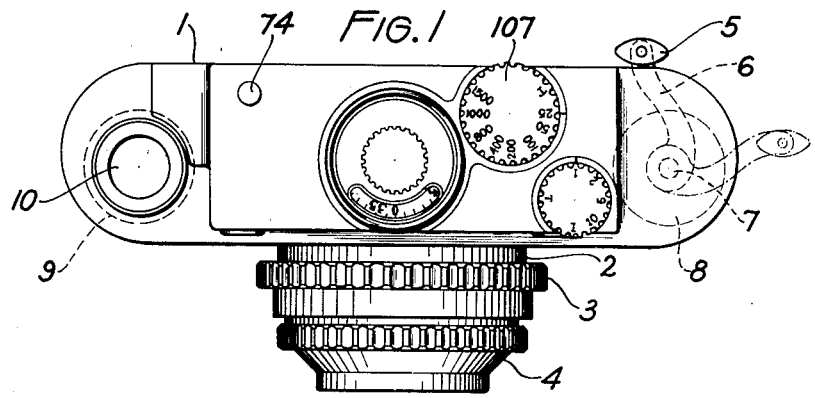
Fig. 1 is a top plan view of a typical camera equipped with my improved double exposure prevention device constructed in accordance with and embodying a preferred form of my invention.
Figure 2:
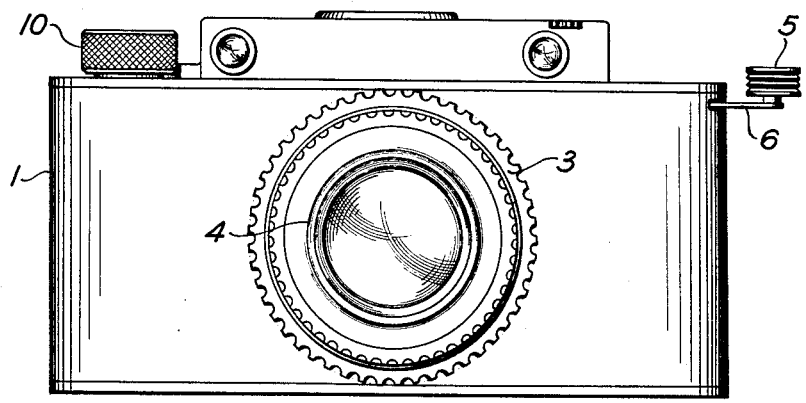
Fig. 2 is a front plan view of the camera shown in Fig. 1.

Referring to Fig 1, as a typical embodiment of my invention, I have shown a camera casing 1, having a front extension 2, carrying a ring 3, which may be used to focus a camera objective carried by the lens cell 4 in any usual or known manner. This camera is provided with a film winding handle 5, pivotally attached to a lever 6, which may be oscillated with a shaft 7 for winding a film upon a take-up spool, diagrammatically illustrated in Fig. 1 at 8. The diagrammatically illustrated supply spool 9 may be attached to a rewinding handle 10, so that if a film retort is used, as is customary with miniature cameras, the film may be wound back again onto the supply spool 9 after all the exposures have been made.

Figure 3:
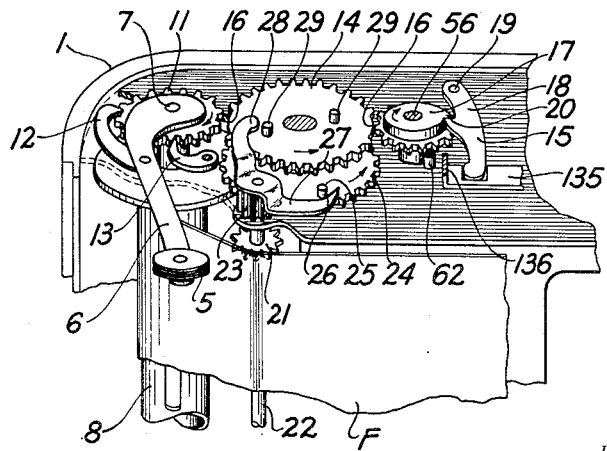
Fig. 3 is a fragmentary detail perspective view of a portion of the film winding and shutter setting interlocking mechanism.

From Fig. 3, it should be noticed that the winding handle 5 which is attached to the shaft 7 may be used to turn the gear 11 in a clockwise direction with regard to Fig. 3. This movement takes place because the pawl 12 engages teeth of the gear, driving it in one direction, while the pawl 13 prevents reverse winding as the pawl 12 slides idly over the teeth when the handle 5 moves in a reverse direction. Thus, the film F may be wound upon the take-up spool 8 by oscillating the handle 5 back and forth until the proper number appears in the red window in the back of the camera.

A train of gears, which includes gear 11, a mutilated gear 14, and a gear 15, is used to transmit power from the film winding handle to the shutter winding shaft 56. Gear 14 is provided with two portions 16 from which the teeth have been removed. Consequently, when the parts are in the position shown in Fig. 3, the gear 11 may turn freely without moving gear 14, during which time the gear 15, of course, also remains stationary.

When film is being wound, the first part of the movement of gear 11 turns gear 14 and with it gear 15, until the mutilated portions of the gear 16 lie opposite the gears 11 and 15. There are sufficient teeth on the gear 14 for one-half a revolution of this gear to fully wind the shaft 56 to set the shutter, at which point the shaft 56 is latched in a fixed position, beyond which it cannot move because of a cam 17 carried by shaft 56. A latch member 18, pivoted at 19, is arranged to engage the latching tooth 20 of member 17 and thus prevent the shaft 56 from being wound too far.

As the film F is wound on the spool 8, a pinwheel 21 bites into the film, turning a shaft 22, and with it a gear 23 meshing with the gear 24, which constitutes a measuring roll, one revolution of which measures off one film area. This gear carries a pin 25 which may engage a cam 26 on the lever 27 mounted to turn freely on the shaft 22 and having an end 28 adapted to engage either one of two pins 29 carried by the mutilated gear 14. The reason for this is as follows:

Fig. 3 shows the parts after the handle 6 has been oscillated a sufficient number of times to fully wind the shutter shaft 56. As above explained, when this occurs the mutilated portions 16 of the gear 14 are opposite the gears 11 and 15, and consequently the handle 6 may be oscillated an additional number of times to wind a film area into place. These oscillations cause the pinwheel 21 to turn the gear 23 and the measuring gear 24, and as the end of one revolution of gear 24 approaches, pin 25 strikes cam 26 of lever 27, causing the end 28 of the lever to engage a pin 29 on the gear 14, swinging this gear about its axis until the gear segments mesh with the gears 11 and 15.

Since the gear 15 has been previously latched by fully winding the shutter, the handle 5 can no longer be oscillated and the film winding movement comes to a stop. Thus, any attempt to wind film will be unsuccessful.

The next operation is to depress the trigger member 74 shown in Fig. 6. This, through the bell crank lever 75, pulls on the rod 77, causing the lever 72 to strike the end of the bell crank lever 60, releasing the cam 57 so that the shaft 56 is free to rotate. This permits the gear 100 to turn and through the mechanism shown in my two above mentioned patents, the front shutter curtain FC and the rear shutter curtain RC are successively released to cross the exposure aperture to make an exposure. The first shutter curtain is released by means of the lever 60, and as this curtain starts to unwind, the gears 100, 64, 65 and 51 all turn so that the cam 101 also turns, permitting the pin 102 to follow the edge of the cam so that the lever 95, turning upon the pivot 96, may float until one end 94 strikes the lever 97 and the end 98 strikes the end 99 of a releasing latch, releasing the cam 47 so that the second shutter curtain may move across the exposure aperture. All this occurs quickly, the duration of the time being controlled by the setting of the lever 97, which lever is turned about a pivot 105 by means of a pin 90 projecting into a cam slot 106, the position of the cam slot being altered by the speed setting dial 107.

It will be noted from the above description that the means for moving the film, here shown as the oscillatable handle 5, can move to wind film on the take-up reel until such time as this movement is positively stopped by means of the measuring roll turning the mutilated gear so that the teeth on this gear will latch the winding handle against movement by latching it to the set shutter. As soon as this occurs, no further film winding can take place. However, as soon as the shutter is released and an exposure has been made, the parts return to an inoperative position so that a second depression of the trigger 74 will have no effect since the shutter has not been set. Consequently, the next action is to again wind the film, since the first part of the film winding movement sets and latches the shutter. It will thus be seen that it is impossible to make two exposures on one film, because the shutter will not make an exposure until the film has been wound, and after the shutter has been locked and when film has been wound, no further film can be wound until after the shutter trigger has been operated.

What I claim as my invention and desire to be secured by Letters Patent of the United States is:

1. In a camera including a shutter of the setting type adapted to be latched in a set position and means for supporting a roll of film, the combination of a shutter setting member for moving the shutter parts to latch them in a set position, a trigger for releasing the latch to make an exposure, with a mounting on which said setting member may move to tension a shutter spring, a film winding handle for turning a film spool to wind convolutions of film thereon, connections between the winding handle and setting member comprising at least two gears one connected to the film spool and the other connected to the shutter setting member, a third mutilated gear rotatably mounted between the two gears for connecting and disconnecting the two gears, means including the winding handle and the gears for winding film and setting the camera shutter by transmitting a predetermined movement from the handle to the setting member by turning the gears until disconnected by the mutilated gear, and means operable by the film for connecting the gears and stopping the film wind by connecting the film winding spool to the shutter setting member latched in a set position after a predetermined area of film has been wound.

2. In a camera including a shutter of the setting type and means for supporting a roll of film, the combination of a shutter setting member, with a mounting on which said setting member may move to tension a shutter spring, a film winding handle for turning a film spool to wind convolutions of film thereon, connections between the winding handle and setting member comprising at least two gears, a third mutilated gear rotatably mounted between the two gears for connecting and disconnecting the two gears, means including the winding handle and the gears for winding film and setting the camera shutter by transmitting a predetermined movement from the handle to the setting member by turning the gears until disconnected by the mutilated gear, means for latching the shutter setting member when moved to a set position by the gearing, and means operable by the film for connecting the film winding handle to the latched shutter setting member after a predetermined film area has been wound into position for exposure by turning the mutilated gear to connect the two gears, whereby the winding operation is automatically halted.

3. In a camera including a shutter of the setting type and means for supporting a roll of film, the combination of a shutter setting member, with a mounting on which said setting member may move to tension a shutter spring, a film winding handle for turning a film spool to wind convolutions of film thereon, connections between the winding handle and setting member comprising at least two gears, a third mutilated gear rotatably mounted between the two gears for connecting and disconnecting the two gears, means including the winding handle and the gears for winding film and setting the camera shutter by transmitting a predetermined movement from the handle to the setting member by turning the gears until disconnected by the mutilated gear, means for latching the shutter setting member when moved to a set position by the gearing, a film measuring device driven from the film adapted to move a predetermined amount to measure an area of film for exposure by turning the mutilated gear to connect the two gears, and means operable by the measuring device for connecting the film winding handle and the latched shutter setting member whereby movement of the former is prevented by the latter.

4. In a camera including a shutter of the setting type and means for supporting a roll of film, the combination of a shutter setting member, with a mounting on which said setting member may move to tension a shutter spring, a film winding handle for turning a film spool to wind convolutions of film thereon, connections between the winding handle and setting member comprising at least two gears, a third mutilated gear mounted between the two gears for connecting and disconnecting the two gears, means including the winding handle and the gears for winding film and setting the camera shutter by transmitting a predetermined movement from the handle to the setting member by turning the gears until disconnected by the mutilated gear, means for latching the shutter setting member when moved to a set position by the gearing, a film measuring device driven from the film and including a disk adapted to turn one revolution to each film area measured for exposure, a lever pivotally mounted adjacent said disk and the mutilated gear and positioned for engagement by the measuring disk for turning the mutilated gear from the measuring disk to connect the two gears, whereby the winding handle may be connected to the latched shutter setting member and further film movement may be prevented.

5. In a camera including a shutter of the setting type and means for supporting a roll of film, the combination of a shutter setting member, with a mounting on which said setting member may move to tension a shutter spring, a film winding handle for turning a film spool to wind convolutions of film thereon, connections between the winding handle and setting member comprising at least two gears, a third mutilated gear mounted between the two gears for connecting and disconnecting the two gears, means including the winding handle and the gears for winding film and setting the camera shutter by transmitting a predetermined movement from the handle to the setting member by turning the gears until disconnected by the mutilated gear, means for latching the shutter setting member when moved to a set position by the gearing, a film measuring device driven from the film and including a disk adapted to turn one revolution to each film area measured for exposure, a lever pivotally mounted adjacent said disk and the mutilated gear, pins on the disk and mutilated gear adapted to be engaged by parts of the lever, whereby motion may be transmitted from the measuring disk to turn the mutilated gear to connect the two gears to latch the winding lever to the already latched shutter setting member.

6. In a camera including a film winding shaft and a focal plane shutter, the combination of a pair of relatively movable curtains constituting the shutter, means tending to move the curtains in one direction, a latch mechanism for holding the curtains in tensioned position, means for winding the film spool, gearing connecting the film wind and curtain shutter for tensioning the shutter, and including a plurality of gears, a mutilated gear between two of said gears, a latch for holding the shutter in a set position when moved to the set position by the gearing, a measuring roll and means actuated by the measuring roll for turning the mutilated gear to connect the two gears after the shutter is wound to lock the film winding means through said gears from the shutter.

7. In a camera, a double exposure prevention device comprising a film wind, a shutter, a shutter setting member, a latch for holding the shutter setting member in an operative position, a trigger for releasing the shutter setting device to make an exposure, rotatable gears at least one of which is mutilated forming connections between the film wind and shutter setting member for moving the latter from the former until the shutter is latched, the mutilated gears having teeth positioned to disconnect the film wind and shutter setting lever after the shutter is latched, and means operable by the film for latching the winding member to the latched shutter after a predetermined area of film has been wound into place for exposure, whereby the shutter may be released for exposure and the film may be wound only in sequential relation.

8. In a camera, a double exposure prevention device comprising a film wind, a shutter setting member, a latch for holding the shutter setting member in an operative position; a trigger for releasing the shutter setting device to make an exposure, connections between the film wind and shutter setting member for moving the latter from the former until the shutter is latched comprising a plurality of gears, one of which is mutilated having two sets of teeth and two areas from which the teeth are removed, said mutilated gear being rotatably mounted between the two gears and having the number and spacing of the teeth so arranged that the gears may be disconnected after the shutter is completely wound, whereby said film wind movement may be continued, a film measuring disk pivotally mounted adjacent the mutilated gear, pins carried by the measuring disk and mutilated gear, a pivoted lever, the ends of which project into the paths of said pins whereby the mutilated gear may be turned by the measuring disk to mesh the teeth of the gears and mutilated gear to prevent continued movement of the film wind.

9. In a camera, a double exposure prevention device comprising a film wind, a shutter setting member, a latch for holding the shutter setting member in an operative position, a trigger for releasing the shutter setting device to make an exposure, connections between the film wind and shutter setting member for moving the latter from the former until the shutter is latched comprising a plurality of gears, one of which is mutilated, having two sets of teeth and two areas from which the teeth are removed, said mutilated gear being rotatably mounted between the two gears and having the number and spacing of the teeth so arranged that the gears may be disconnected after the shutter is completely wound, whereby said film wind movement may be continued, a film measuring gear, a pinion meshing with said gear, a pinwheel for turning the pinion through movement of the film, pins on the measuring gear and mutilated gear having arcuate paths of movement and a bell crank lever pivoted adjacent the paths of the pins and positioned to transmit movement through the pins from the measuring gear to turn the mutilated gear after predetermined movement of the measuring gear.

10. In a roll holding camera, the combination with a camera body, of spool chambers therein, a film winding post extending into one spool chamber, a lever for turning the post in one direction and extending through a slotted camera wall, a focal plane shutter, means for winding up the focal plane shutter from the film winding post comprising gears on the said post and focal plane shutter, a mutilated gear lying between said gears and having toothed areas adapted to mesh with and connect said gears, said toothed areas being spaced by mutilated areas, said mutilated gear being adapted to connect said gears through said toothed areas, and to disconnect said gears when the mutilated portions of said mutilated gear are positioned opposite said gears, and means operable by the moving film for controlling movement of the mutilated gear.

11. In a roll holding camera, the combination with a camera body, of spool chambers therein, a film winding post extending into one spool chamber, a lever for turning the post in one direction and extending through a slotted camera wall, a focal plane shutter, means for winding up the focal plane shutter from the film winding post comprising gears on the said post and focal plane shutter and a mutilated gear rotatably mounted between them, the first gear being adapted to be connected by the mutilated gear and to be disconnected therefrom by the mutilated portions of said gear, and means operable by the moving film for controlling movement of the mutilated gear and including a film measuring gear, a pin carried thereby, a lever adapted to be engaged and moved by the pin, a pin carried by the mutilated gear also adapted to be engaged by the lever whereby the measuring gear may turn the mutilated gear through the lever.

JOSEPH MIHALYI.